(12) United States Patent
Janis et al.

(10) Patent No.: US 7,984,930 B2
(45) Date of Patent: Jul. 26, 2011

(54) PRECONDITIONED AIR CONNECTOR ASSEMBLY FOR AIRCRAFT

(75) Inventors: Alan J. Janis, Green Valley, CA (US); Folkert Fred Koch, San Ramon, CA (US); Wolfgang Ott, Antioch, CA (US); Christopher Robin Drake, Fairfield, CA (US); Brian Michael Piety, Vacaville, CA (US); Mark David Resendes, Dixon, CA (US)

(73) Assignee: Illinois Tool Works Inc., Glenview, IL (US)

( * ) Notice: Subject to any disclaimer, the term of this patent is extended or adjusted under 35 U.S.C. 154(b) by 23 days.

(21) Appl. No.: 11/592,867

(22) Filed: Nov. 3, 2006

(65) Prior Publication Data

US 2007/0200343 A1 Aug. 30, 2007

Related U.S. Application Data

(63) Continuation of application No. 10/602,310, filed on Jun. 24, 2003, now Pat. No. 7,152,886.

(51) Int. Cl.
*F16L 37/20* (2006.01)
*B65B 1/04* (2006.01)

(52) U.S. Cl. ......... 285/312; 285/311; 285/358; 141/383

(58) Field of Classification Search ............ 285/87, 285/311, 312, 320, 325, 358, 409; 292/11, 292/46, 97–98, 113, 132, 232; 141/382, 141/383, 384

See application file for complete search history.

(56) References Cited

U.S. PATENT DOCUMENTS

| 317,030 | A | | 5/1885 | Siddall |
| 406,964 | A | * | 7/1889 | Stedman et al. ............ 285/1 |
| 476,711 | A | | 6/1892 | Whelan |
| 762,777 | A | | 6/1904 | Vernon |
| 935,587 | A | | 9/1909 | Casey |
| 949,608 | A | | 2/1910 | Watt |
| 1,361,856 | A | | 12/1920 | Heininger |
| 1,639,813 | A | | 8/1927 | Schawrow |
| 1,793,015 | A | | 2/1931 | Roos |
| 2,333,423 | A | | 11/1943 | Hufferd |
| 2,487,801 | A | | 11/1949 | Healy, Jr. |
| 2,505,245 | A | | 4/1950 | Hollerith |

(Continued)

FOREIGN PATENT DOCUMENTS

DE 946938 8/1956

(Continued)

*Primary Examiner* — James M Hewitt
(74) *Attorney, Agent, or Firm* — Fletcher Yoder

(57) ABSTRACT

In certain embodiments, a PCA connector has a nylon body, wherein the nylon is durable, corrosion resistant, and exhibits excellent strength over a large range of temperature and moisture conditions. The nylon body may be described as a single structure with integral features, such as a bearing portion, a latch housing portion, a latch guide portion, and so forth. Thus, the number of parts is significantly reduced by the one-piece design of the body. In addition, the PCA connector may include a latching mechanism configured to secure the PCA connector to an aircraft. For example, the latching mechanism may include a pair of levers, which engage a pair of latches on opposite sides of the nylon body. In some embodiments, the levers may be rotated in opposite directions relative to one another to impart movement of the latches in the same direction, e.g., an axial direction. Also, some embodiments of the latching mechanism include a cam between the levers and the latches, respectively.

23 Claims, 5 Drawing Sheets

U.S. PATENT DOCUMENTS

| | | | |
|---|---|---|---|
| 1,573,866 A | 3/1958 | Zimmerman et al. | |
| 2,951,717 A | 9/1960 | Zaber | |
| 2,974,580 A * | 3/1961 | Aleksa et al. | 454/154 |
| 3,300,235 A | 1/1967 | Blackwell, Jr. | |
| 3,330,313 A | 7/1967 | Rosell | |
| 3,425,717 A | 2/1969 | Bruce | |
| 3,442,535 A | 5/1969 | Frohlich | |
| 3,489,434 A | 1/1970 | Haley | |
| 3,494,641 A | 2/1970 | Caregnato | |
| 3,527,480 A | 9/1970 | Larson | |
| 3,618,988 A | 11/1971 | Zurmuehlen | |
| 3,664,375 A | 5/1972 | Marette | |
| 3,721,359 A | 3/1973 | Howell et al. | |
| 3,750,643 A * | 8/1973 | Fowler et al. | |
| 4,142,740 A * | 3/1979 | Wilms | |
| 4,552,333 A * | 11/1985 | Niemi | |
| 4,599,935 A * | 7/1986 | Ellermann et al. | |
| 4,623,172 A * | 11/1986 | Shepheard | |
| 4,917,414 A * | 4/1990 | Boulanger | |
| 5,005,876 A * | 4/1991 | Fahl | |
| 5,060,982 A * | 10/1991 | Matsushita | |
| 5,316,347 A * | 5/1994 | Arosio | |
| 5,355,917 A * | 10/1994 | Kofflin | |
| 5,464,042 A * | 11/1995 | Haunhorst | |
| 5,588,908 A * | 12/1996 | Camarota | 454/78 |
| 5,722,697 A * | 3/1998 | Chen | 285/91 |
| 5,740,846 A * | 4/1998 | Larson et al. | |
| 5,911,445 A * | 6/1999 | Lee | 285/84 |
| 5,924,744 A * | 7/1999 | Eberle | |
| 5,927,355 A * | 7/1999 | Kofflin | |
| 5,988,697 A * | 11/1999 | Arosio | |
| 6,116,300 A * | 9/2000 | Kofflin | |
| 6,289,949 B1 * | 9/2001 | Shumaker et al. | |
| 6,298,876 B1 * | 10/2001 | Bogdonoff et al. | |
| 7,210,712 B2 | 5/2007 | Artsiely | |
| 2004/0201215 A1 * | 10/2004 | Steingass | 285/376 |

FOREIGN PATENT DOCUMENTS

GB         346860         4/1931

* cited by examiner

PRECONDITIONED AIR CONNECTOR ASSEMBLY FOR AIRCRAFT

CROSS REFERENCE TO RELATED APPLICATION

This application is a continuation of U.S. patent application Ser. No. 10/602,310, entitled "Preconditioned Air Connector Assembly for Aircraft", filed Jun. 24, 2003 now U.S. Pat. No. 7,152,886, which is herein incorporated by reference.

BACKGROUND

An aircraft in flight utilizes various subsystems to maintain a comfortable cabin environment. For example, these subsystems may provide electricity, maintain cabin pressure or control the circulation and temperature air within the cabin. However, on the ground, these subsystems may be at least partially deactivated in an effort to conserve power and the life expectancy of aircraft components. Upon deactivation of the climate control subsystem, for example, the conditions within the aircraft may become undesirable for the maintenance crew preparing the aircraft for the next flight or for passengers boarding or deplaning. Accordingly, many airports provide docking stations which, when coupled to the aircraft, substitute for the aircraft's subsystems.

In one such example, it is common practice in the air transportation industry to provide preconditioned air (PCA) to an aircraft docked at a gate. Typically, the preconditioned air is routed from a ground source, through a flexible conduit and into the aircraft. In completing the routing, a PCA connector is provided to securely couple the conduit to the aircraft. Because PCA connectors are coupled to various types of aircraft, aircraft manufactures as well as PCA connector manufacturers have traditionally adhered to a common design. More particularly, the design specifications as set forth in Military Standards MS33562 (ASG) entitled "Connection, Aircraft Ground Air Conditioning, 8 inch, minimum requirements."

This uniformity in design permits the same PCA connector to be used at airports worldwide. Accordingly, PCA connectors are subject to environmental conditions that range from tropical to artic tundra to arid dessert. Moreover, the frequency with which PCA connectors are engaged and disengaged from a given aircraft suggests the desirability of a durable and sturdy design. All too often, PCA connectors have been known to be disengaged from the aircraft and subsequently dropped, approximately 8-10 feet, to the ground. This can dent, deform or otherwise damage conventional connectors.

BRIEF DESCRIPTION

In certain embodiments, a PCA connector has a nylon body, wherein the nylon is durable, corrosion resistant, and exhibits excellent strength over a large range of temperature and moisture conditions. The nylon body may be described as a single structure with integral features, such as a bearing portion, a latch housing portion, a latch guide portion, and so forth. Thus, the number of parts is significantly reduced by the one-piece design of the body. In addition, the PCA connector may include a latching mechanism configured to secure the PCA connector to an aircraft. For example, the latching mechanism may include a pair of levers, which engage a pair of latches on opposite sides of the nylon body. In some embodiments, the levers may be rotated in opposite directions relative to one another to impart movement of the latches in the same direction, e.g., an axial direction. Also, some embodiments of the latching mechanism include a cam between the levers and the latches, respectively.

DRAWINGS

The foregoing and other advantages and features of the invention will become apparent upon reading the following detailed description and upon reference to the drawings in which.

Figure 1:
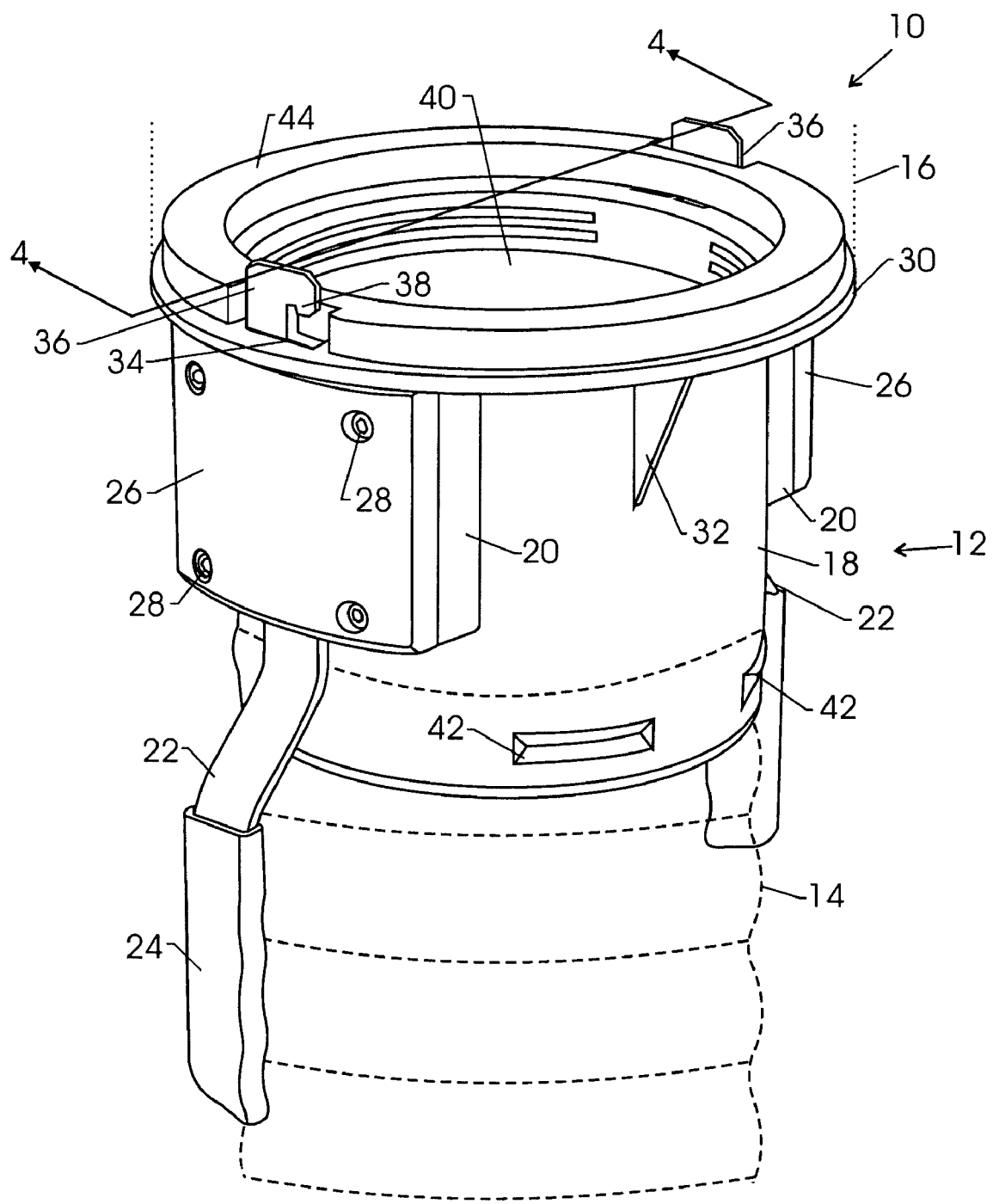
FIG. 1 is a top perspective view of an exemplary PCA connector, wherein the PCA connector is coupled to a flexible conduit represented in the figure in dashed lines.
Figure 3A:
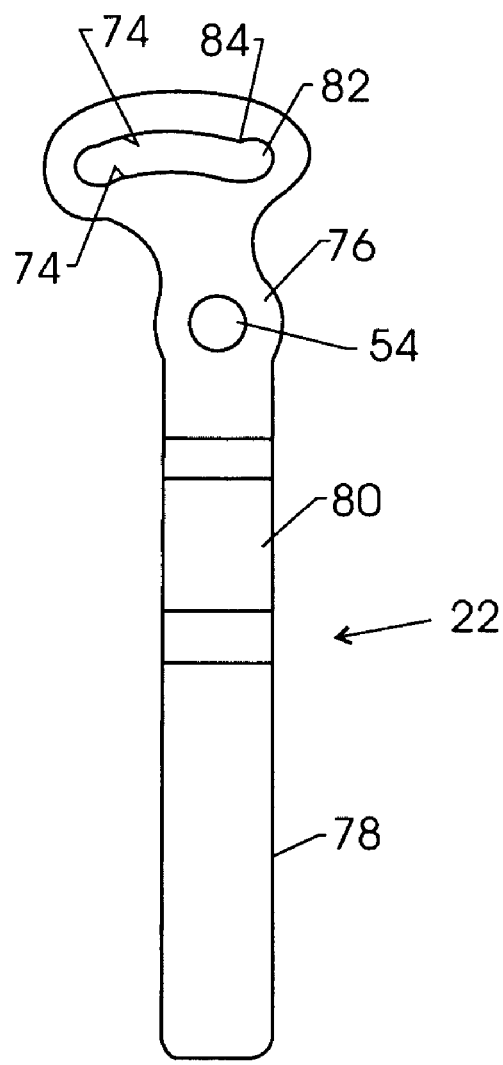
Figure 3B:
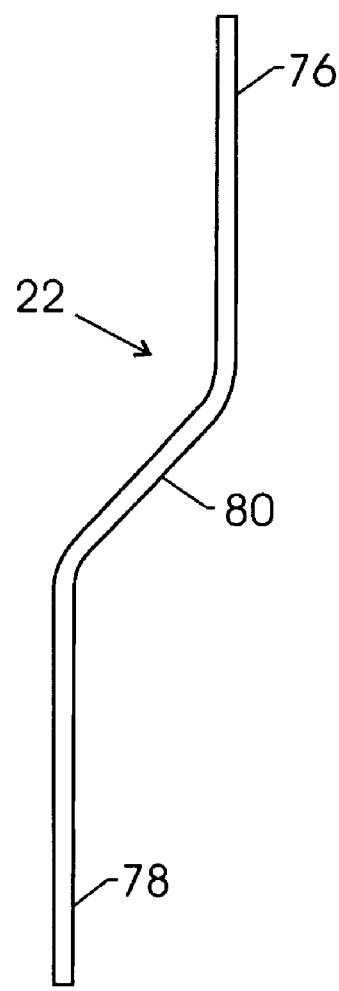
Figure 4:
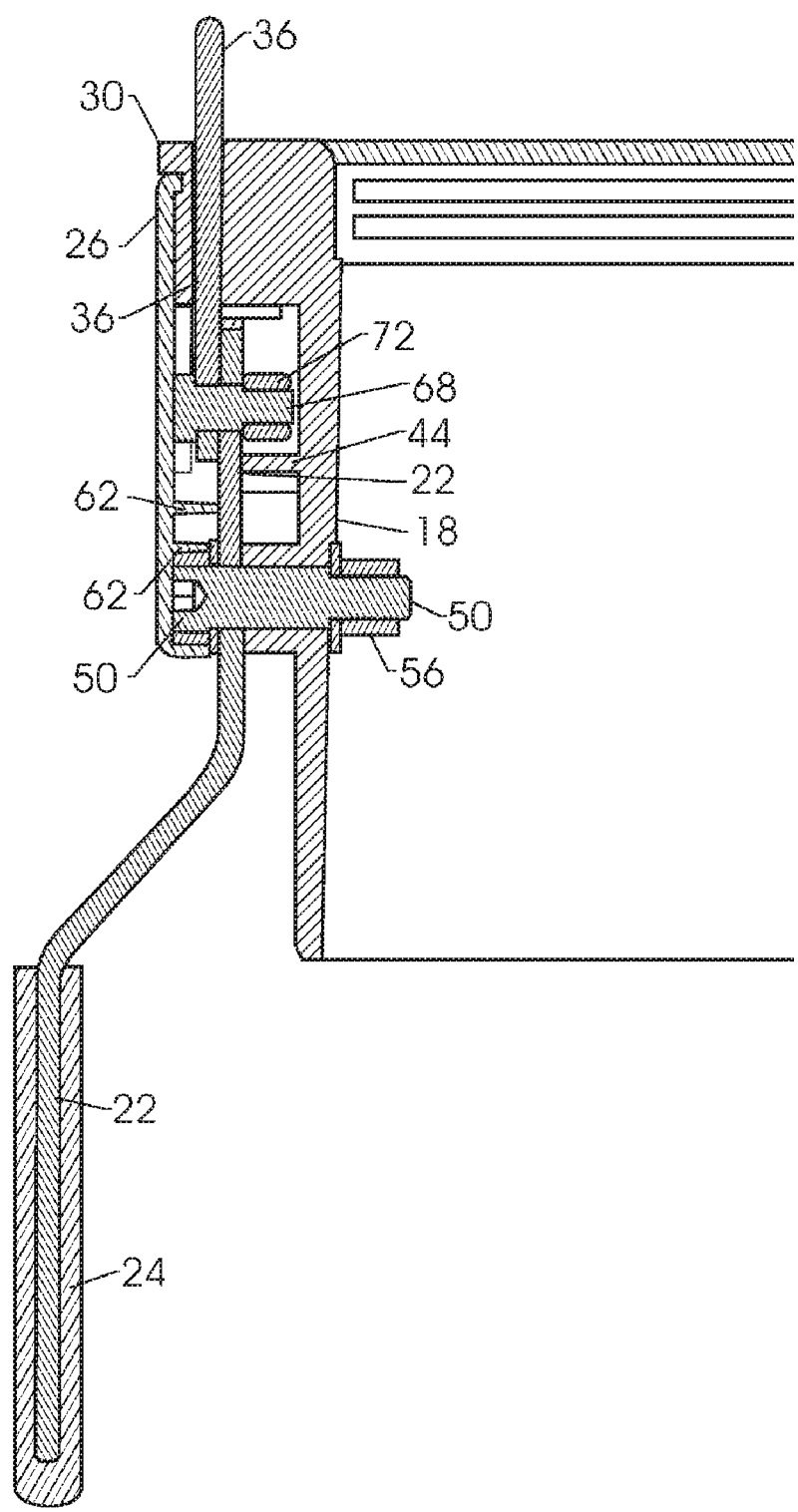
Figure 5:
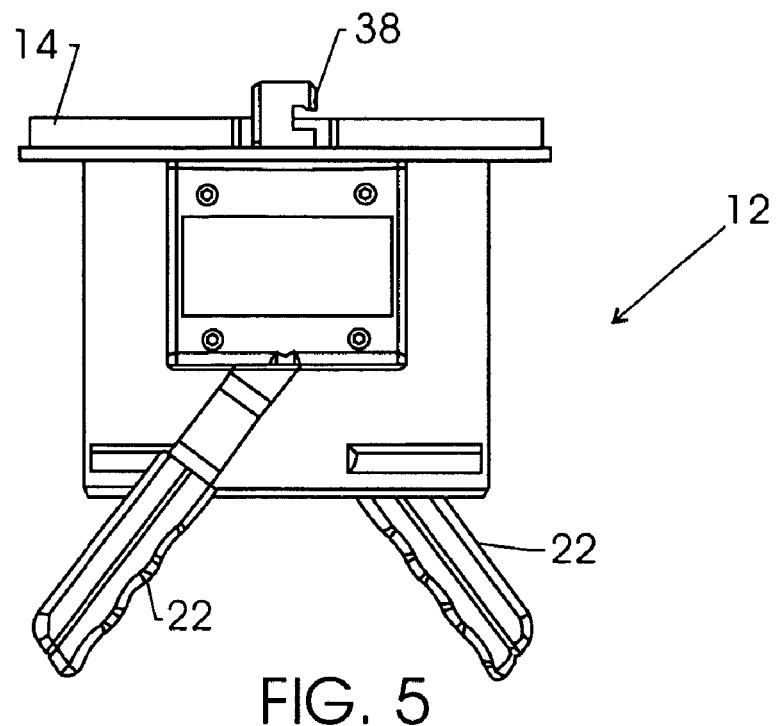
Figure 6:
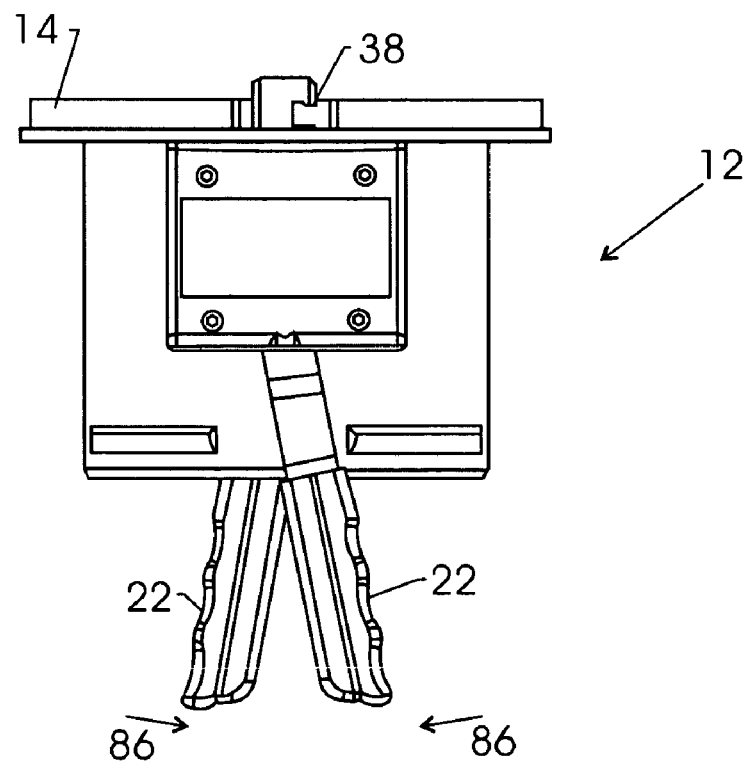

FIGS. 3A and 3B respectively illustrate plan and side views of an exemplary actuation member, wherein the actuation member includes a camming surface disposed within a slot; additionally, FIG. 3A illustrates a locking portion located within the slot;

FIG. 4 is a cross-sectional view of the exemplary PCA connector of FIG. 1 along line 4-4;

FIG. 5 illustrates a side view of the exemplary PCA connector in the unlocked or open position; and FIG. 6 illustrates a side view of the exemplary PCA connector as transitioning to the locked or closed position.

DETAILED DESCRIPTION

Referring generally to FIG. 1, an exemplary embodiment of a PCA connector assembly 10 is illustrated. The exemplary PCA connector assembly 10 comprises a PCA connector 12 having a flexible conduit 14 coupled to one end and being coupled, at the opposite end, to an aircraft inlet 16. To provide preconditioned air to the aircraft, the flexible conduit 14 is coupled, at the distal end, to a preconditioned air source (not shown), typically provided by the airport facility at each gate. Upon arrival of the aircraft at the gate, an operator may manually align the connector 12 with the inlet 16 and, subsequently, secure the connector to the aircraft. Once fully secured, the PCA connector assembly 10 provides a fluid flow path for the preconditioned air to travel from the source to the aircraft.

To facilitate this coupling, the PCA connector 12 comprises a number of features. In one embodiment, the PCA connector 12 comprises a tubular body 18 having integrated bearing structures 20. Only the external casings of the integrated bearing structures 20 are visible in this figure. However, the internal features of the respective bearing structures 20 are further described in greater detail below.

As discussed above, the connector 12 may be subject to harsh environments and operator abuse. Keeping this in mind, the connector 12, for optimal use, may be designed to withstand changes in climate that can induce thermal cracking, unwanted expansion and corrosion in traditional connectors. Accordingly, the connector 12 may comprise Zytel®, an injection moldable nylon resin available from the DuPont Company. This material provides excellent strength characteristics over a large range of temperature and moisture conditions. Moreover, this material is extremely resistant to corrosion. Accordingly, Zytel® presents characteristics desirable to the construction of the instant connector 12. However, other materials are also envisaged. For example, many other types of injection-moldable plastics such as HDPE may provide suitable performance, particularly as compared to traditional materials. Advantageously, injection molded plastics also provide a lightweight construction that permits an operator to easily manipulate and position the connector 12.

Returning to the components of the connector 12, a pair of actuating members 22 is coupled to the body 18. Advantageously, the actuating members 22 may be employed to position the assembly 10 and may also be employed to provide actuation leverage, as further discussed below. To provide a more ergonomic gripping surface for the operator, cushioned grips 24 may be sheathed over the actuating members 22. Additionally, in the exemplary connector 12, covers 26, secured by a plurality of screws 28 threadingly engaged to the body 18, are disposed over a portion of the actuating members 22 and coupled to the bearing assembly 20.

The connector 12 further comprises a flange portion 30 that extends along the perimeter of one side of the body 18. Structural support may be provided to the flange 30 portion by integrated buttresses 32 located optimally about the body 18. Features of the exemplary flange 30 are apertures 34 through which securing members 36 partially extend. In this figure, only a clamping portion 38 of the respective securing members 36 is visible. However, other features of the securing members 36 are discussed more fully below. Also, as further discussed below, actuation of the securing members 36 facilitates coupling of the exemplary connector 12 to the aircraft inlet 16.

Upon coupling of the connector 12 to the aircraft inlet 16, preconditioned air may be routed, under pressure, from the preconditioned air source into the interior region of the flexible conduit 14. From the conduit 14, the preconditioned air is then routed into the aircraft inlet 16 through an interior region 40 of the connector 12. To ensure that the conduit 14 remains coupled to connector 12 during operation, a band clamp (not shown) may be disposed just above stop ribs 42 and tightened. Accordingly, the band clamp imparts a radially inward force constraining the conduit on the connector 12 and, resultantly, aids in securing the conduit 14 to the connector 12. Additionally, a flexible seal 44 may be disposed between the flange 30 and the inlet 16 to prevent the unwanted escape of preconditioned air. Once the preconditioned air route is assembled, preconditioned air may be routed therethrough and subsequently distributed into the cabin and cockpit of the aircraft via an internal duct system (not shown).

Figure 2:
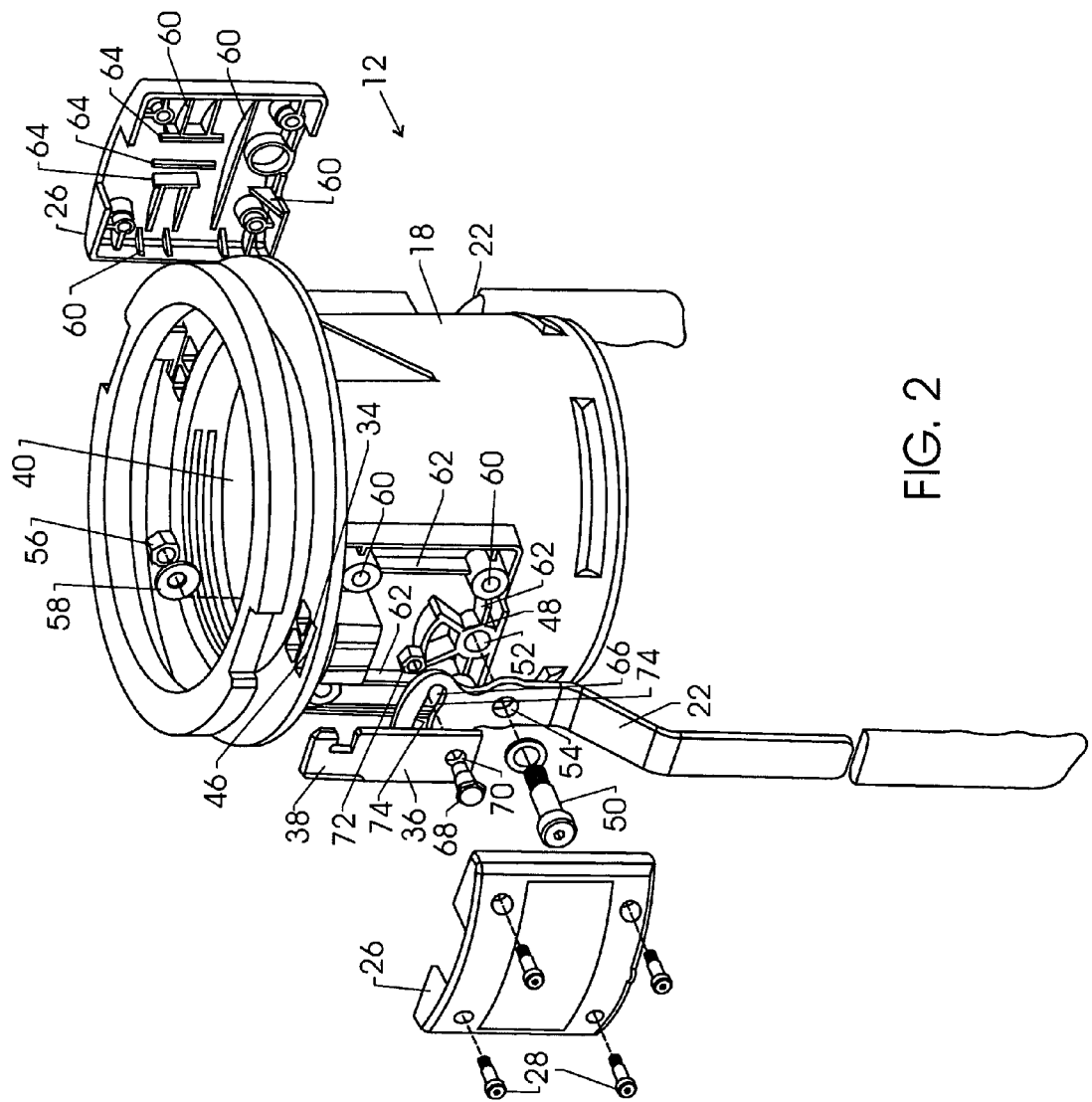
FIG. 2 is an exploded view of the exemplary PCA connector of FIG. 1 illustrating a number of exemplary features integrated into the body of the connector.

Referring next to FIG. 2, a number of exemplary features that may be integrated into the body 18 of the connector 12 are illustrated. For example, the body 18 may comprise an integrated guide channel 46. When assembled, at least a portion of the securing member 36 resides within the guide channel 46. Advantageously, to prevent the unwanted rotational and radial movements of the securing member 36, the dimensions of the guide channel 46 are such that the guide channel 46 closely sheaths the securing member 36. In other words, the guide channel 46 may be configured to restrict movement of the securing member 36 to the axial or, based on the orientation of the present figure, up and down directions. In the present embodiment, the guide channel 46 terminates at the aperture 34, and, as such, only the clamping portion 38 of the securing member 36 remains accessible when the connector 12 is assembled.

Another feature integrated into the body 18 of the exemplary connector 12 may be an integrated bearing structure 48. In the exemplary embodiment shown, the integrated bearing structure 48 provides support to actuation member 22 which, in turn, is pivotably coupled to the body 18, as well as to the securing member 36. Simply put, the bearing structure 48 supports the radial and thrust loads imparted on the actuation member 22. By integrating the bearing assembly 48 into the body 18, the likelihood of separation between the body 18 and the bearing support 48 is reduced. To the operator, the increased durability may quickly translate into a reduction in maintenance expenses as well as a reduction in down time.

Focusing on the pivotable coupling between the actuation member 22 and the body 18, this coupling comprises a pivot pin 50 received by an integrated sleeve portion 52 of the bearing 48, wherein the sleeve portion 52 traverses into the interior region 40 of the connector 12. In assembling the coupling, the pivot pin 50 may be coaxially inserted through a pivot opening 54 disposed on the actuation member 22 and, subsequently, through the integrated sleeve 52. After insertion of the pivot pin 50, the coupling may be secured by fastening a securing nut 56 which may be threaded onto the portion of the pivot pin 50 extending beyond the sleeve 52 and into the interior region 40 of the connector 12. If so desired, washers 58 may be coaxially placed between the pin 50 and the actuation member 22 as well as between securing nut 56 and the body 18. As assembled, the coupling allows rotation of the actuation member 22, while the bearing structure 48 supports the radial and thrust loads and prevents undesired movement of the actuation member 22 in the radial and axial directions.

Additional features integrated into the body 18 may be cover mounts 60 and brace members 62. In this exemplary embodiment, the cover mounts 60 threadingly receive the screws 28, thereby securing the cover 26 to the body. Extending between the respective cover mounts 60 as well as between the cover mounts 60 and the integrated bearing structure 48, are bracing members 62 which, in the exemplary embodiment, provide torsional rigidity to the body 18 and the respective integrated features. Additionally, as further discussed below, the bracing members 62 may assist in the support and alignment of the cover 26.

The covers 26 may comprise a number of integrated interior features that are advantageous to the assembly of the connector 12. For example, the cover 26 may comprise integrated buttresses 64. The buttresses 64 may be oriented vertically and, when the cover 26 is assembled, may be dimensioned such that the securing member 36 lightly abuts against the buttresses 64. Additionally, bracing members 62 may also be integrally fashioned on the cover 26. The bracing members 62, similar to those on the body 18, may provide alignment assistance and torsional rigidity to the cover 26.

Focusing on the actuation member 22 and securing members 36 of the present exemplary embodiment, FIG. 2 illustrates that the two members may be coupled to one another. In achieving this coupling, the actuation member 22 may comprise a slot 66 through which an engagement pin 68 may be received. The engagement pin 68 may be inserted through the slot 66 as well as through a positioning hole 70 located in the lower portion of the securing member 36. Once properly aligned, the securing member 36 and the actuation member 22 may be securely coupled by fastening a retaining nut 72 onto the threaded portion of the engagement pin 68. Upon assembly, the disposition of the engagement pin 68 within the slot 66 positionably couples the securing member 36 to the actuation member 22. Moreover, as discussed above, the integrated guide channel 46 of the exemplary embodiment restricts movement of the securing member 36 to the axial direction, and, as such, provides support to the securing member 36. Accordingly, the securing member 36 is primarily supported by the actuation member 22 to which it is coupled.

In conjunction with a camming surface 74, as defined by the perimeter of the slot 66, the pivotal movement of the actuation member 22 directs the axial movement of the securing member 36. In other words, the rotational movement of the actuation member 22 translates into the axial displacement of the securing member 36. Because the integrated guide channel 46 restricts movement of the securing member to all but the axial direction, only the axial component of force applied to the securing member 36 or engagement pin 68 will result in displacement of the securing member 36. Keeping this in mind, the kinetic interaction between the camming surface 74 and the engagement pin 68 imparts a number of forces on the securing member 32, however, only the axial component of the applied force will result in displacement, which, as discussed above, is limited to the axial direction. Accordingly, as the actuation member 22 is rotated in a direction generally tangential with respect to the body 18, the camming surface 74 defines the axial position of the securing member 32.

Particulars of the exemplary actuation member 22, slot 66 and camming surface 74 are more clearly illustrated in regards to FIGS. 3A and 3B. The actuation member 22 comprises an upper portion 76 coupled to a lower portion 78 by a transition portion 80. In this exemplary embodiment, the lower portion 78 may be configured to reside further outward, radially, with respect to the body 18 (see FIG. 2). Advantageously, this outward configuration provides additional access space between the lower portion 78 and the flexible conduit 14 (see FIG. 1) to the operator.

The upper portion 76 of the actuation member 22 comprises both the pivot opening 54 as well as the slot 66. In this embodiment, the perimeter of the slot 66 defines an arcuate camming surface 74. However, other arrangements are also envisaged. For example, the camming surface 74 may be angular in nature. The present arcuate camming surface 74, however, provides a smooth transitional surface. In other words, during actuation, the interaction between the engagement pin 68 (see FIG. 2) and the camming surface 74 produces a smooth axial displacement of the securing member 36 (see FIG. 2). To maintain good mechanical fit, the pivot opening 54 and the slot 66 may be dimensioned to have respective diameters only slightly larger than the respective pins 50 and 68 they carry. By dimensioning the opening 54 and slot 66 as such, a more precise and controlled movement of the assembly can be achieved.

Within the slot 66 may be a locking portion 82. In the presented embodiment, the locking portion 82 receives the engagement pin 68 and releasably retains the engagement pin 68. By retaining the engagement pin 68, the actuation member 22 may be secured at the defined position. Accordingly, undesired or accidental axial movement of the securing member 36 may be avoided.

The exemplary locking portion 82 may comprise an apex 84 that restricts movement of the engagement pin 68 within the slot 66. When the engagement pin 68 is brought into abutment with one side of the apex 84, the movement of the pin 68 within the slot 66 is resisted. To overcome the resistance, an additional pivotal force may be applied to the actuation member 22. The additional force, in turn, may induce a slight elastic deformation (i.e. compression) in the seal 44 (see FIG. 1). This slight deformation allows the engagement pin 68 to travel into the locking portion of the slot. Subsequently, to release the engagement pin 68 from the locking portion 84, a pivotal force in the opposite direction may be applied to the actuation member 22, thereby inducing a similar compression in the seal 44 for removal of the connector 12 from the aircraft. Seal 44 may thus serve as a biasing element in the assembly. Alternatively, other biasing elements may be provided to allow releasable locking of the actuation member 22 in its engaged position.

Referring next to FIG. 4, the cross-sectional illustration of the exemplary connector 12 affords a view of the interaction, upon assembly, of the features therein. For example, this figure illustrates the presently preferred dimensional relationships between the various components. As one example, the close dimensioning between the bracing member 62, the actuating member 22 and the integrated bearing structure 48 provides supplementary mechanical rigidity to the connector 12.

Additionally, FIG. 4 illustrates the dependency of the axial position of the securing member 36 on that of the camming surface 74. In the axial direction, the securing member 36 is primarily supported by the engagement pin 68 which, in turn, is primarily supported, again in the axial direction, by the camming surface 74. Keeping in mind that the integrated guide channel 46 as well as certain features on the cover 26 restrict movement of the securing member 36 to the axial direction, forces imparted on the engagement pin 68 by the camming surface 74 will cause displacement of the securing member 36 in the axial direction. In other words, the relative height of the camming surface 74 defines the axial position of the securing member 36. Accordingly, the rotational motion of the actuating member 36, in a direction generally tangential to the body, translates into axial displacement of the securing member 36.

Referring to FIGS. 5 and 6, operation of the present embodiment is addressed. When the aircraft is docked at the gate, the operator may manually position the connector 12 into abutment with the aircraft inlet 16 (see FIG. 1). At this point, the connector 12 is in the released configuration as illustrated in FIG. 5. In this configuration, the lower portions of the actuation members 22 are at offset positions with respect to one another. Additionally, the securing members 36 are in an upwardly biased position. This upward position, allows a latching portion (not shown) disposed on the aircraft inlet 16 (see FIG. 1) to be freely inserted into the clamping portion of the securing members 32.

After the connector 12 is properly positioned with respect to the aircraft inlet 16 and latching portion, the operator may pivotally actuate the actuation members 22 in a direction generally tangential to the body and in a direction 86 towards one another, as depicted in FIG. 6. Referring also to FIG. 2, the actuation initiates engagement between the camming surface 74 and the engagement pin 68. The camming surface 74 directs the clamping portion 38 of the securing member 36 in the downward direction. This causes the clamping portion 38 to securely engage with a latching portion (not shown) of the aircraft inlet 16. Moreover, the actuation, of the present embodiment, draws the connector 12 into abutting engagement with the inlet 16 and compresses the seal 44 (FIG. 1).

As stated above, the slot 66 (see FIG. 1) may comprise a locking portion 82 (see FIG. 3A) that secures the position of the respective actuating member 22. In this embodiment, the locking portion 82 may be configured within the slot 66 such that the locking portion 82 secures the connector 12 in the fully engaged position thereby maintaining secured engagement between the aircraft inlet 16 (see FIG. 1) and the connector 12. In other words, upon final engagement, the locking portion maintains the actuation members 22 in a parallel configuration, and simultaneously maintains the securing member 36 in the downward position.

In limiting the movement of the securing member 36 to the axial direction, a number of advantages may be realized. For example, the axial movement of the securing member 32 draws the flexible seal 44 into engagement with the aircraft inlet 16, thereby creating a tight seal between the inlet 16 and the connector 12. Additionally, limiting the movement of the securing member 32 to the axial direction reduces the likelihood of damage to the clamping portion 38. Simply put, the limitation or axial reduces the potentially damaging affects of sliding or rotational abutment between the clamping portion 38 and the latching portion of the inlet 16.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A preconditioned air connector, comprising:
   a one-piece nylon body, comprising:
      a hollow portion having an air passage;
      a latch housing portion comprising a plurality of rib portions, a cover fastener portion, and a bearing portion, wherein the latch housing portion is configured to house a latch mechanism, and the bearing portion is configured to support the latch mechanism;
   wherein the hollow portion, the latch housing portion, and the bearing portion are integrated together in the one-piece nylon body.

2. The preconditioned air connector of claim 1, wherein the one-piece nylon body is an injection-molded, nylon-resin body.

3. The preconditioned air connector of claim 1, wherein the preconditioned air connector comprises a cover coupled to the latch housing portion about a latch support region.

4. The preconditioned air connector of claim 3, wherein the preconditioned air connector comprises the latch mechanism disposed in the latch support region between the cover and the latch housing portion, wherein the latch mechanism at least partially rotates against the bearing portion.

5. The preconditioned air connector of claim 1, wherein the bearing portion is configured to support a rotatable lever of the latch mechanism.

6. The preconditioned air connector of claim 1, wherein the one-piece nylon body comprises a latch guide portion.

7. The preconditioned air connector of claim 6, wherein the latch guide portion comprises a latch guide channel.

8. The preconditioned air connector of claim 7, wherein the latch guide channel is oriented in an axial direction relative to the air passage, the latch guide channel extends from the latch housing portion, and the latch guide channel is configured to restrict movement of the latch to the axial direction.

9. The preconditioned air connector of claim 1, wherein the preconditioned air connector comprises a plurality of levers configured to move in opposite directions from one another along the one-piece nylon body to cause the latch and another latch to engage or disengage with an external conduit, and each lever is configured to move in an arc along a respective plane tangential to the one-piece nylon body.

10. The preconditioned air connector of claim 1, wherein the one-piece nylon body comprises another latch housing portion disposed on an opposite side of the hollow portion relative to the latch housing portion.

11. The preconditioned air connector of claim 10, wherein the one-piece nylon body comprises another bearing portion disposed on the opposite side of the hollow portion relative to the bearing portion.

12. The preconditioned air connector of claim 11, wherein the preconditioned air connector comprises a first lever supported by the latch housing portion and positioned rotatably on the bearing portion, and the preconditioned air connector comprises a second lever supported by the other latch housing portion and positioned rotatably on the other bearing portion.

13. The preconditioned air connector of claim 12, wherein the preconditioned air connector comprises a first cover coupled to the latch housing portion over the bearing portion and at least part of the first lever, and the preconditioned air connector comprises a second cover coupled to the other latch housing portion over the other bearing portion and at least part of the second lever.

14. The preconditioned air connector of claim 12, wherein the preconditioned air connector comprises first and second latches configured to move in an axial direction in response to rotational movement of the first and second levers, respectively.

15. The preconditioned air connector of claim 14, wherein the first and second levers are configured to rotate in opposite directions from one another to impart movement of the first and second latches in the same axial direction as one another.

16. The preconditioned air connector of claim 14, wherein first lever and the first latch comprise a first camming joint, and the second lever and the second latch comprise a second camming joint.

17. The preconditioned air connector of claim 1, wherein the preconditioned air connector comprises an aircraft preconditioned air connector configured to couple with an aircraft and a preconditioned air supply.

18. The preconditioned air connector of claim 1, comprising a conduit coupled to the preconditioned air connector and configured to route a preconditioned air supply from a source to an aircraft via the preconditioned air connector.

19. A preconditioned air connector, comprising:
   a one-piece nylon body, comprising:
      a hollow portion having an air passage;
      a flange portion extending along a perimeter of one end of the nylon body;
      a bearing portion configured to support a rotatable lever;
      a latch housing portion comprising a plurality of rib portions, a cover fastener portion, and the bearing portion, wherein the latch housing portion extends to the flange portion; and
      a latch guide portion comprising a latch guide channel oriented in an axial direction relative to the air passage and configured to restrict movement of a latch to the axial direction.

20. The preconditioned air connector of claim 19, wherein the one-piece nylon body comprises:
   one or more buttresses attached to the flange portion and configured to provide support to the flange portion; and
   one or more stop ribs disposed on an exterior surface of the one-piece nylon body and configured to couple with a band clamp.

21. A preconditioned air connector, comprising:
   a one-piece nylon body, comprising:
      a hollow portion having an air passage;
      a latch housing portion configured to house a latch mechanism; and
      a bearing portion configured to support the latch mechanism, wherein the hollow portion, the latch housing portion, and the bearing portion are integrated together in the one-piece nylon body;
   a cover coupled to the latch housing portion about a latch support region; and
   the latch mechanism disposed in the latch support region between the cover and the latch housing portion, wherein the latch mechanism at least partially rotates against the bearing portion.

22. A preconditioned air connector, comprising:
a one-piece nylon body, comprising:
- a hollow portion having an air passage;
- a latch housing portion configured to house a latch mechanism;
- a bearing portion configured to support the latch mechanism, wherein the hollow portion, the latch housing portion, and the bearing portion are integrated together in the one-piece nylon body; and
- a latch guide portion comprising a latch guide channel, wherein the latch guide channel is oriented in an axial direction relative to the air passage, the latch guide channel extends from the latch housing portion, and the latch guide channel is configured to restrict movement of the latch to the axial direction.

23. A preconditioned air connector, comprising:
a one-piece nylon body, comprising:
- a hollow portion having an air passage;
- a latch housing portion configured to house a latch mechanism;
- another latch housing portion disposed on an opposite side of the hollow portion relative to the latch housing portion;
- a bearing portion configured to support the latch mechanism; and
- another bearing portion disposed on the opposite side of the hollow portion relative to the bearing portion, wherein the hollow portion, the latch housing portions, and the bearing portions are integrated together in the one-piece nylon body; and a first lever supported by the latch housing portion and positioned rotatably on the bearing portion;
a second lever supported by the other latch housing portion and positioned rotatably on the other bearing portion;
a first cover coupled to the latch housing portion over the bearing portion and at least part of the first lever; and
a second cover coupled to the other latch housing portion over the other bearing portion and at least part of the second lever.

* * * * *